United States Patent
Tajima

(10) Patent No.: US 7,177,450 B2
(45) Date of Patent: Feb. 13, 2007

(54) FACE RECOGNITION METHOD, RECORDING MEDIUM THEREOF AND FACE RECOGNITION DEVICE

(75) Inventor: Johji Tajima, Tokyo (JP)

(73) Assignee: NEC Corporation, Tokyo (JP)

(*) Notice: Subject to any disclaimer, the term of this patent is extended or adjusted under 35 U.S.C. 154(b) by 609 days.

(21) Appl. No.: 09/820,376

(22) Filed: Mar. 27, 2001

(65) Prior Publication Data
US 2001/0031073 A1    Oct. 18, 2001

(30) Foreign Application Priority Data
Mar. 31, 2000  (JP) ............................. 2000-099625

(51) Int. Cl.
G06K 9/00    (2006.01)
G06F 7/00    (2006.01)

(52) U.S. Cl. ..................... 382/118; 382/154; 340/5.83; 902/3

(58) Field of Classification Search ................ 382/118, 382/190, 203, 209, 218–222, 224
See application file for complete search history.

(56) References Cited

U.S. PATENT DOCUMENTS

| | | | | |
|---|---|---|---|---|
| 5,774,129 A | * | 6/1998 | Poggio et al. | 345/441 |
| 6,035,055 A | * | 3/2000 | Wang et al. | 382/118 |
| 6,292,575 B1 | * | 9/2001 | Bortolussi et al. | 382/118 |
| 6,381,346 B1 | * | 4/2002 | Eraslan | 382/118 |
| 6,956,569 B1 | * | 10/2005 | Roy et al. | 345/426 |

FOREIGN PATENT DOCUMENTS

| | | |
|---|---|---|
| JP | H04-101280 A | 4/1992 |
| JP | H06-168317 A | 6/1994 |
| JP | H09-259271 A | 10/1997 |
| JP | H09-305771 A | 11/1997 |
| JP | H08-50660 A | 2/1998 |

OTHER PUBLICATIONS

"Face Recognition Under Varying Pose" by Beymer. Computer Vision and Pattern Recognition, 1994. Proceedings CVPR '94., 1994 IEEE Computer Society Conference on, Jun. 21-23, 1994. pp. 756-761.*

"3D Facial Image Analysis for Human Identification" by Nagamine et al. Pattern Recognition, 1992. vol. 1. Conference A: Computer Vision and Applications, Proceedings., 11th IAPR International Conference on, Aug. 30-Sep. 3, 1992. pp. 324-327.*

(Continued)

*Primary Examiner*—Jingge Wu
*Assistant Examiner*—Charles Kim
(74) *Attorney, Agent, or Firm*—Sughrue Mion, PLLC

(57) ABSTRACT

An enquiry face image shot by a video camera and the like is collated with face image data converted into database. The data converted into the database are three-dimensional shape data of surfaces of faces and color image data. Shooting conditions (an angle and lighting directions) of the enquiry image are supplied to the data, and thereby a color image of each person's face from the database in accordance with the shooting conditions is generated. By comparing the color image with the enquiry image, the collation is implemented.

45 Claims, 6 Drawing Sheets

OTHER PUBLICATIONS

R. Ishiyama et al., "A Range Finder for Human Face Measurement", The Institute of Electronics, Information and Communication Engineers, Technical Report of IEICE PRMU99-24 (Jun. 1999), pp. 35-42 with Abstract.

S. Sakamoto et al., "Face Image Processing for Newspapers", Meeting on Image Recognition and Understanding (MIRU'98), Information Processing Society of Japan Symposium Series, vol. 98, No. 10, pp. II-397-II-403 with Abstract.

* cited by examiner

FACE RECOGNITION METHOD, RECORDING MEDIUM THEREOF AND FACE RECOGNITION DEVICE

BACKGROUND OF THE INVENTION

The present invention relates to a face recognition method for collating a face-image inputted from an image input device with face shapes and face image data converted into database and a recording medium storing the face recognition method as a program.

DESCRIPTION OF THE RELATED ART

So far, in the case of searching a specific object face image from database storing face images, manual detection in which the object face image is simply put beside a display and compared with the face images displayed one by one from the database to search the identical face image has been performed.

In the conventional style, generally, a large number of human faces are shot from plural directions respectively and converted into database with classification items such as the person's name, sex and age. In the following, it will be called a database face image. At the stage of detection and collation, if a face image name etc. of which are unknown is obtained, the object database is narrowed down by characteristics such as sex and age, pictures or image data are displayed on a screen to be compared manually with the enquiry face image, and the identification of the images is judged by a man. On this occasion, characteristic points of the enquiry face image are uniformly grasped as imagery. When a face image approximate to the imagery is found, it is specified as an approximate database face image, and if it approximates closely, the enquiry face image and the database face image are compared carefully. Although it is improbable that both the images are exactly identical, they can be regarded as almost the same allowing for predicable change of the face image, and often judged to be the face images of the same person.

These recent years, an attempt to automate the above-mentioned process has been made, in which the database face image and the enquiry face image are compared, collated or detected as two-dimensional image data. As the method, a facial part is automatically cut out from the background of the enquiry face image, and its size, brightness, contrast and so on are normalized so as to be equal to those of the database face image. Then coincidence degree of both the images is estimated by placing them, or parts of them, one on the other etc., and a pair showing high coincidence degree is judged to be images of the same person. The method is realized with high precision when the database face image and the enquiry face image are shot in the similar settings by the similar devices, and also an object person wears almost the same expression at the shooting.

The method described above is basically a method for estimating coincidence degree of contrast between two-dimensional images. However, a human face has essentially a three-dimensional shape, therefore even if the expressions of the object person are almost the same, the figure and the contrast of the face images differ depending on angles of the face or lighting conditions. Consequently, the images of the different persons shot at the same angles in the same lighting conditions, rather than the images of the same person shot at the different angles in the different lighting conditions, tend to indicate the higher coincidence degree. In order to avoid the problem, it can be considered to have the images corresponding to conditions regarding all combinations of angles and lighting for the same person as database. However, in this case, the huge amount of data is needed. Thus a system capable of expressing a three-dimensional shape by small amount of data and collating it with a two-dimensional enquiry image which does not demand strict shooting conditions, considering practicality has come into request.

SUMMARY OF THE INVENTION

It is therefore an object of the present invention to provide a face recognition system and an object recognition system which overcome the limit of the conventional recognition system implemented by comparing two-dimensional images.

In accordance with the first aspect of the present invention, for achieving the above object, there is provided a face recognition method for identifying a person by detecting a three-dimensional shape of the person's face and a surface image thereof and collating the three-dimensional shape of the face and the surface image with enquiry face image data, comprising the steps of estimating shooting conditions of the enquiry face image data, generating referential face image data by the shooting conditions and the three-dimensional shape and its surface image using a graphics means, comparing the referential face image data to the enquiry face image data, and identifying the person of the enquiry face image data with the person of the referential face image data when a difference between both the face image data is small.

In accordance with the second aspect of the present invention, the face recognition method having database which stores three-dimensional shapes of human faces and surface images thereof for identifying a person by collating the three-dimensional shape of the specific person's face and the surface image stored in the database with enquiry face image data, comprises the steps of estimating shooting conditions of the enquiry face image data, generating referential face image data by the shooting conditions and the three-dimensional shape and its surface image stored in the database using a graphics means, comparing the referential face image data to the enquiry face image data, and identifying the person of the enquiry face image data with the person of the referential face image data when a difference between both the face image data is small.

In accordance with the third aspect of the present invention, there is provided an object recognition method for identifying an object by detecting a three-dimensional shape of the object and a surface image thereof and collating the three-dimensional shape of the object and the surface image with enquiry image data, comprising the steps of estimating shooting conditions of the enquiry image data, generating referential image data by the shooting conditions and the three-dimensional shape and its surface image using a graphics means, comparing the referential image data to the enquiry image data, and identifying the object of the enquiry image data with the object of the referential image data when a difference between both the image data is small.

In accordance with the fourth aspect of the present invention, the object recognition method having database which stores three-dimensional shapes of a large number of objects and surface images thereof for identifying an object by collating the three-dimensional shape of the specific object and the surface image stored in the database with enquiry image data, comprises the steps of estimating shooting conditions of the enquiry image data, generating referential image data by the shooting conditions and the three-dimensional shape and the surface image stored in the database using a graphics means, comparing the referential image data to the enquiry image data, and identifying the object of the enquiry image data with the object of the referential image data when a difference between both the image data is small.

In accordance with the fifth aspect of the present invention, there is provided a face recognition device for identifying a person by detecting a three-dimensional shape of the person's face and a surface image thereof and collating the three-dimensional shape of the face and the surface image with enquiry face image data, comprising an image input means for obtaining the enquiry face image by specifying shooting conditions of the enquiry face image data, a graphics means for generating referential face image data by the shooting conditions and the three-dimensional shape and its surface image, and an image collating means for comparing the referential face image data with the enquiry face image data to evaluate the data, and identifying the person of the enquiry face image data with the person of the referential face image data when a difference between both the face image data is small.

In accordance with the sixth aspect of the present invention, the face recognition device having database which stores three-dimensional shapes of a large number of human faces and surface images thereof for identifying a person by collating contents of the database with enquiry face image data, comprises a condition input means for specifying shooting conditions of the enquiry face image data to input, the database for storing the three-dimensional shape data of faces and the surface image data, a graphics means for generating referential face image data by the shooting conditions and the three-dimensional shape data and its surface image data stored in the database, an image input means for obtaining the enquiry face image data, and a image collating means for comparing and collating the referential face image data with the enquiry face image data, and identifies the person of the enquiry face image data with the person of the referential face image data when a difference between both the face image data is small.

In accordance with the seventh aspect of the present invention, the object recognition device having database which stores three-dimensional shapes of a large number of objects and surface images thereof for identifying an object by collating contents of the database with enquiry image data, comprises a condition input means for specifying shooting conditions of the enquiry image data to input, the database for storing the three-dimensional shape data of objects and the surface image data, a graphics means for generating referential image data by the shooting conditions and the three-dimensional shape data and its surface image data stored in the database, an image input means for obtaining the enquiry image data, and a image collating means for comparing and collating the referential image data with the enquiry image data, and identifies the object of the enquiry image data with the object of the referential image data when a difference between both the image data is small.

In accordance with the eighth aspect of the present invention, there is provided a recording medium storing a program being readable by a computer to operate a recognition method having database which stores three-dimensional shapes of a large number of human faces and surface images thereof for identifying a person by collating contents of the database with enquiry face image data, wherein the program comprises the steps of estimating shooting conditions of the enquiry face image data, generating referential face image data by the shooting conditions and the three-dimensional shape and its surface image stored in the database using a graphics means, comparing and collating the referential face image data to the enquiry face image data, and identifying the person of the enquiry face image data with the person of the referential face image data when a difference between both the face image data is small.

In accordance with the ninth aspect of the present invention, the recording medium stores a program being readable by a computer to operate a recognition method having database which stores three-dimensional shapes of a large number of objects and surface images thereof for identifying an object by collating contents of the database with enquiry image data, wherein the program comprises the steps of specifying shooting conditions of the enquiry image data to input, generating referential image data by the three-dimensional shape and its surface image stored in the database using a graphics means, obtaining the enquiry image data by an image input means, comparing and collating the referential image data to the enquiry image data, and identifying the object of the enquiry image data with the object of the referential image data when a difference between both the image data is small.

In accordance with the tenth aspect of the present invention, the recording medium stores a program being readable by a computer to operate a recognition method for identifying an object by detecting a three-dimensional shape of the object and a surface image thereof and collating the three-dimensional shape of the object and the surface image with enquiry image data, wherein the program comprises the steps of estimating shooting conditions of the enquiry image data, generating referential image data by the shooting conditions and the three-dimensional shape and its surface image using a graphics means, comparing and collating the referential image data with the enquiry image data, and identifying the object of the enquiry image data with the object of the referential image data when a difference between both the image data is small.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
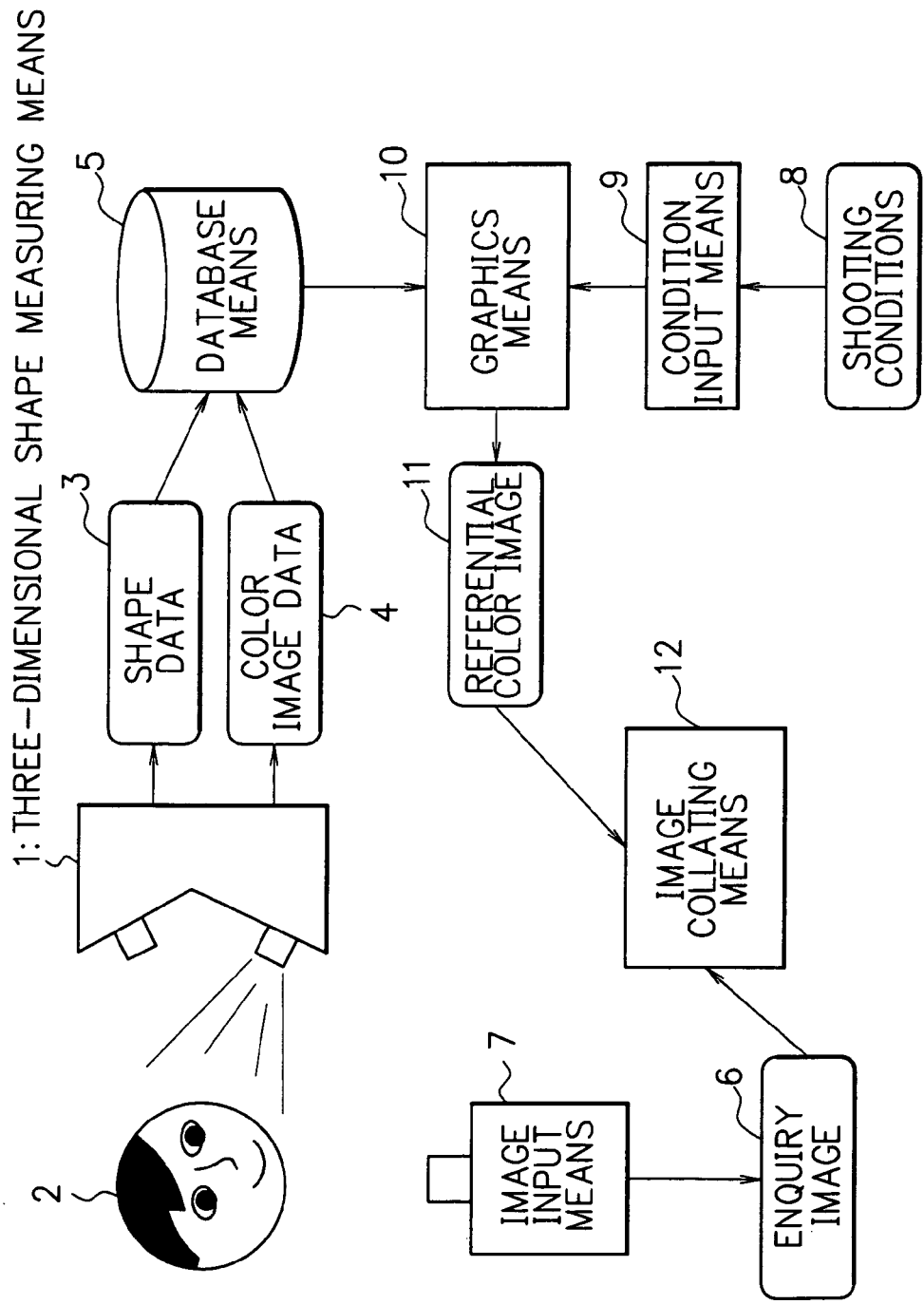
FIG. 1 is a block diagram showing constitution of a face image recognition system according to an embodiment of the present invention.

Referring now to the drawings, a description of a preferred embodiment of the present invention will be given in detail.

An embodiment of a face recognition system according to the present invention will be explained referring to FIG. 1. Using a three-dimensional shape measuring means 1, three-dimensional shapes and color images of various faces 2 which are objects of detection are obtained and stored in database means 5 as a shape data 3 and a color image data 4 following a prescribed expressing pattern. In this case, shooting of the color image data 4 is implemented being lighted from every direction so that each pixel value of the obtained images approximates reflectance ratio of skin. Incidentally, it is also possible to convert the pixel values of the obtained images into the pixel value of the reflectance ratio using the method as estimating an influence of the lighting in the obtained color image and eliminating the influence. Every face facing left, right, up and down direction is inputted in as the color image data corresponding to elements of the three primary colors: red (R), green (G) and blue (b), or using parameters of color capable of indicating chromaticity, luminosity and saturation. Besides, the shape data 3 is shot from front, left, right and back, and shapes of contour, hair, eyes, nose, mouth, eyebrows and so on are stored as database for every face facing left, right, up and down.

An enquiry image 6 is inputted by an image input means 7. A video camera etc. is used as the image input means 7. Although a high precision camera having three million pixels is fine, such high precision is unnecessary and a camera of one million pixels capable of grasping characteristic points of the face image is enough.

The user inputs shooting conditions 8 (an angle or a direction of the face and a lighting condition) of the image by a condition input means 9. A keyboard, a mouse and a touch board or the like are used as the condition input means 9. The lighting condition as well as the angle of the face are designated by designating keys of seven angles: front angle, left/right 90° and 45° angles, upper side 45° angle, lower side 45° angle and so forth, even though it is only three surfaces: front, right and left, needed to indicate the angle of the face. It is also possible to designate the angles by clicking a specific point on the display.

A graphics means 10 generates a two-dimensional referential color image 11 with computer graphics method, using the three-dimensional shape data 3 and the color image data 4 stored in the database means 5 according to the shooting condition 8. In this event, it is preferable that the shooting condition is coincided with the shooting condition of the enquiry image 6. Thus the shooting condition should be designated following shooting situations rather than designated by a rough guess.

An image collating means 12 judges which face is probably the identical one with the enquiry image 6 by comparing the enquiry image 6 with the referential color images 11 of each person, calculating coincidence degrees and comparing the coincidence degrees. The calculation of the coincidence degree will be described later.

Figure 2:
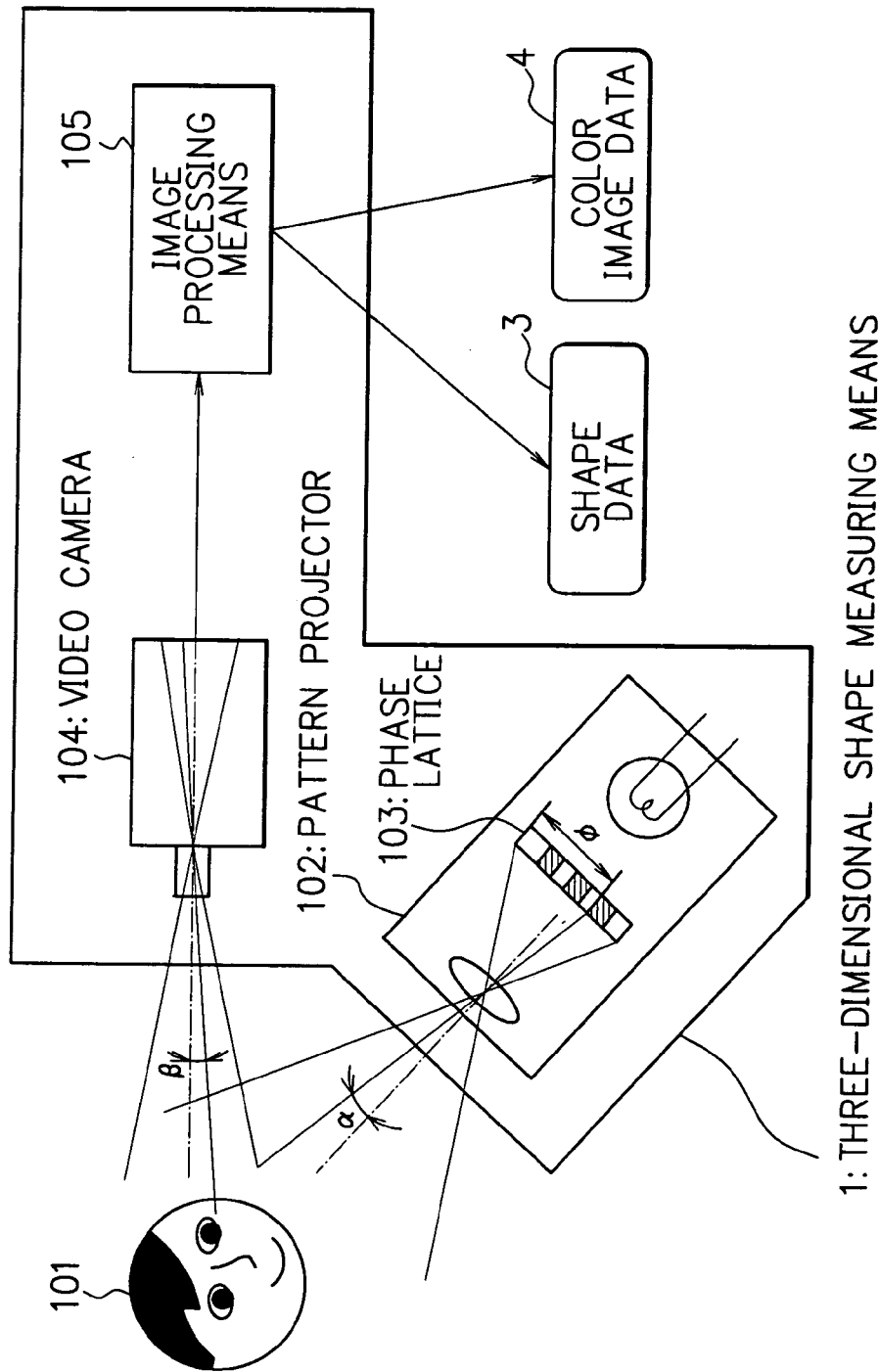
FIG. 2 is a diagram explaining an example of three-dimensional shape obtaining means of the present invention.
Figure 3:
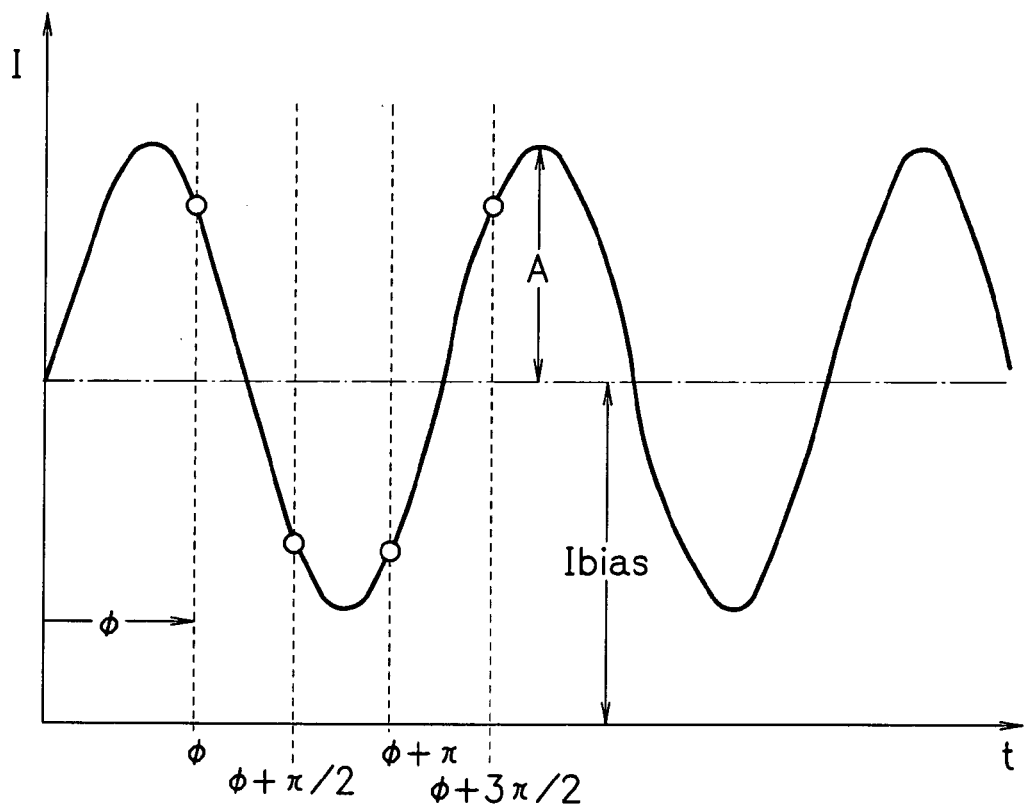
FIG. 3 is a diagram explaining pixel value obtained for each pixel of a video camera by the example of three-dimensional shape obtaining means of the present invention.

Referring now to the drawings, a description of each part of the present embodiment will be given in detail. FIGS. 2 and 3 are showing the three-dimensional shape measuring means 1 for obtaining a three-dimensional shape and a color image of a face. As an example of the three-dimensional shape measuring means 1, constitution of "A Range Finder for Human Face Measurement" described in detail in the technical report of Institute of Electronics, Information and Communication Engineers, Pattern Recognition and Media Understanding Society (PRMU99-24) issued on June 1999 written by Ishiyama, Sakamoto et al., will be explained briefly. In the technical report, some examples of measuring method of a three-dimensional shape where a three-dimensional shape model is obtained using the range finder are introduced. Here, a phase-shift method using a sinusoidal lattice is selected from among other methods such as a spot-light/slit-light scanning method using a laser beam which requires a long measuring time, a space cord method using a high-speed pattern projection/camera device and so on. In the phase-shift method, a sinusoidal light-intensity pattern is projected as its phase is changing in time sequence, and space is coded by a phase value of light-intensity pattern at observed time sequence. The phase-shift method has characteristics such as needing only three images at least, being capable of measuring three-dimensional shape of every pixel, easily obtaining higher precision by adding pixels and numbers of the images, and being capable of measuring a color texture image simultaneously.

In FIG. 2, a pattern of a phase lattice 103 is projected to a face 101 from a light pattern projector 102. The phase lattice 103 has spatially sinusoidal transmittance shown in FIG. 3, and as its position is changed, a plurality of images are inputted. Then, at a specific point on the face, intensity of projected light changes by time as shown in FIG. 3. When the scene is shot by a video camera 104, intensity of a reflected ray at the pixels (u, v) on the t-th image is obtained as the following equation (1).

$$I(u, v, t) = I_{bias}(u, v) + A(u, v)\cos(\phi + t) \quad (1)$$

Here, $I_{bias}(u, v)$ expresses the reflected ray of a direct current component of an environmental light pattern and a projection light pattern, $A(u, v)$ expresses intensity of the projection light pattern.

Incidentally, $\phi$ indicates an initial phase value of the first image of a projected sinusoidal wave pattern at the position. In FIG. 3, the initial phase value $\phi$ is set about at 120°. The initial phase value $\phi$ in each pixel is calculated by an image processing means 105 using inputted images according to following equations (2) to (5).

$$I = I_{bias} + A(\cos\phi\cos t - \sin\phi\sin t) \quad (2)$$

$$\int_0^{2\pi} I \cos t \, dt = A\cos\phi \int_0^{2\pi} \cos^2 t \, dt = C\cos\phi \quad (3)$$

$$\int_0^{2\pi} I \sin t \, dt = -A\sin\phi \int_0^{2\pi} \sin^2 t \, dt = -C\sin\phi \quad (4)$$

$$\phi(u, v) = \tan^{-1} \frac{-\int_0^{2\pi} I\sin t \, dt}{\int_0^{2\pi} I\cos t \, dt} \quad (5)$$

Since the initial phase value $\phi$ closely relates to a projection angle $\alpha$ shown in FIG. 2, when the $\phi$ in each pixel is obtained, the projection angle $\alpha$ is defined. Besides, an incident angle $\beta$ to the video camera 104 is obtained from the position of the pixel (u, v). A positional relationship between a projection point of the sinusoidal wave pattern and a camera has been decided. Thus the two points, the projection angle $\alpha$ and the incidence angle $\beta$ of the video camera 104 are obtained, a triangle is decided uniquely, and thereby distance from the video camera 104 to an object in each pixel is obtained. Finally, a three-dimensional coordinates (X, Y, Z) of a face surface for each pixel is obtained by setting an origin at an appropriate position. Thereby the shape data 3 of the face surface is generated by generally known technique such as comprising a triangle patch by combining the obtained three dimensional coordinates with adjacent others.

Moreover, the color image data 4 of the object face is obtained from a plurality of images by following equation (6).

$$I_{bias}(u, v) = \frac{1}{2\pi} \int_0^{2\pi} I(u, v, t) \, dt \qquad (6)$$

The foregoing is described in the above-described technical report. Also in the present invention, the shape data 3 and the color image data 4 of the face image are obtained by the same process by the three-dimensional shape obtaining means 1 according to the above equations.

Figure 4:
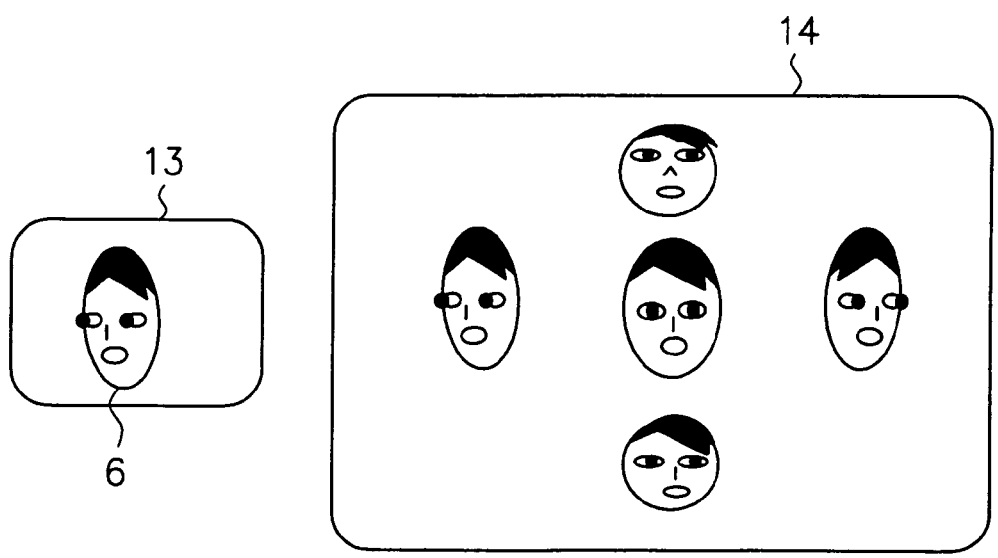
FIG. 4 is a diagram explaining a method of deciding an angle of face of an enquiry face image by a condition input means of the present invention.

Referring to FIG. 4, an example of operations by the condition input means 9 and the graphics means 10 will be descried. A display monitor-A13 is a monitor for displaying the enquiry image, provided to the face recognition system to display situations of the condition input means 9 and the system.

In FIG. 4, since the enquiry image 6 is generally incapable of defining an angle of a face or a position of lighting and a camera, it is not shot being lighted from every direction as the color image data stored in the database means 5. Consequently, the image cannot be collated with the data stored in the database means 5 directly. In order to realize the collation, the shooting conditions 8 of the enquiry image is inputted in the graphics means 10 by the condition input means 9, and thereby the referential color image 11 is generated using the stored shape data 3 and color image data 4.

The shooting condition 8 basically means an angle of a face and lighting directions. First, the face's angle is defined. According to the present embodiment, the face's angle is decided by comparing the display monitor-A13 showing the enquiry image 6 with a display monitor-B14 showing images at standard angles and selecting one by a user. A model example showing five varieties of face images: facing "forward", "right", "left", "downward" and "upward", on the display monitor-B14 is shown in FIG. 4. The user selects the closest angle by input keys as he/she is comparing the enquiry image and the images at standard angles. Although in the example of FIG. 4, the "left angle" is selected from among the five varieties of images, it is desirable to select the angle as precise as possible by comparing the enquiry image with images at dozens of angles in order to obtain higher collating precision. Incidentally, the shooting condition 8 can be designated by estimating a standard shooting condition when the shooting condition of the enquiry image 6 cannot be specified.

On the occasion of storing the shape data 3 and the color image data 4 in the database means 5, characteristic points such as "position(s) of pupil(s)" and "a center of a mouth" are supplied manually and the positions of the points are also stored in the database means 5. Similarly, as for the enquiry image 6, the angle can be decided by supplying the above characteristic points manually and comparing the positions of the characteristic points of both the images.

Figure 5:
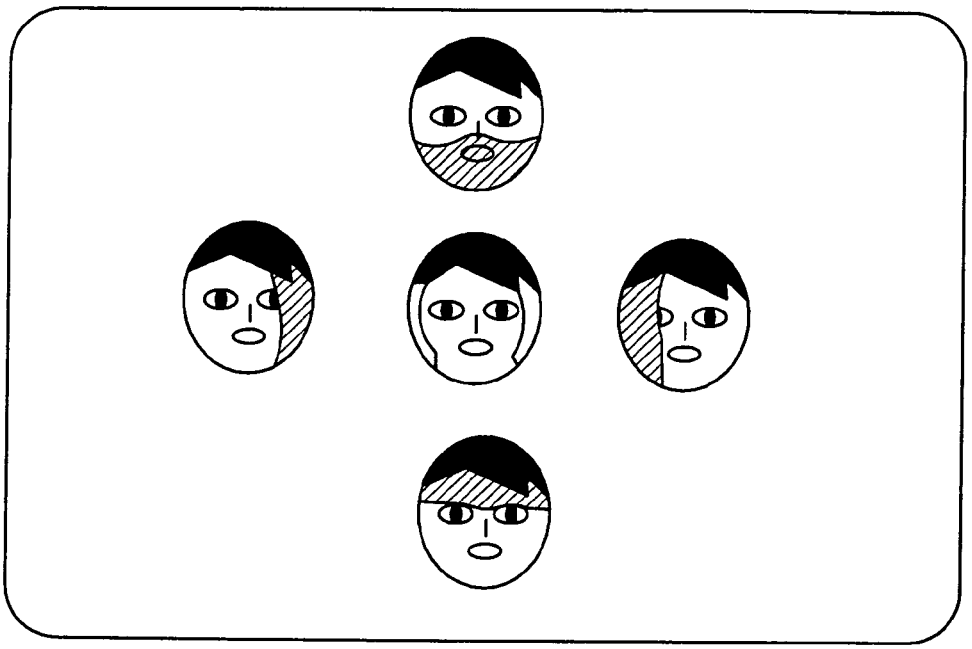
FIG. 5 is a diagram explaining a method of deciding a direction of lighting of an enquiry face image by a condition input means of the present invention.

Next, the lighting direction is defined. In this event, the lighting direction is also decided by comparing standard lighting images corresponding to the above decided face's angle displayed on the display monitor-B14 with the enquiry image 6 and selecting one by the user. In an example of FIG. 5, five varieties of images of standard lighting directions: "forward", "right", "left", "downward" and "upward", for the face facing forward are shown. The user selects the closest lighting by input keys as he/she is comparing the enquiry image 6 and the standard lighting images. Although in the example of FIG. 5, the lighting direction is selected from among the five varieties of images, it is desirable to select the lighting direction as precise as possible by comparing the enquiry image with dozens of standard lighting images in order to obtain higher collating precision. Incidentally, a known method for estimating the lighting direction automatically from the image is applicable.

Besides, in the above example of the five varieties of images, the lighting direction is only one, however, there can be the lighting from two or three directions. In this case, it is desirable to request the selection of the shooting conditions for a plurality of lighting directions to be displayed on the display monitor and select ones by key-input. Furthermore, it is also desirable to set variations in intensity of illuminance, for example strong, medium and weak illumination intensity, and select one.

Figure 6:
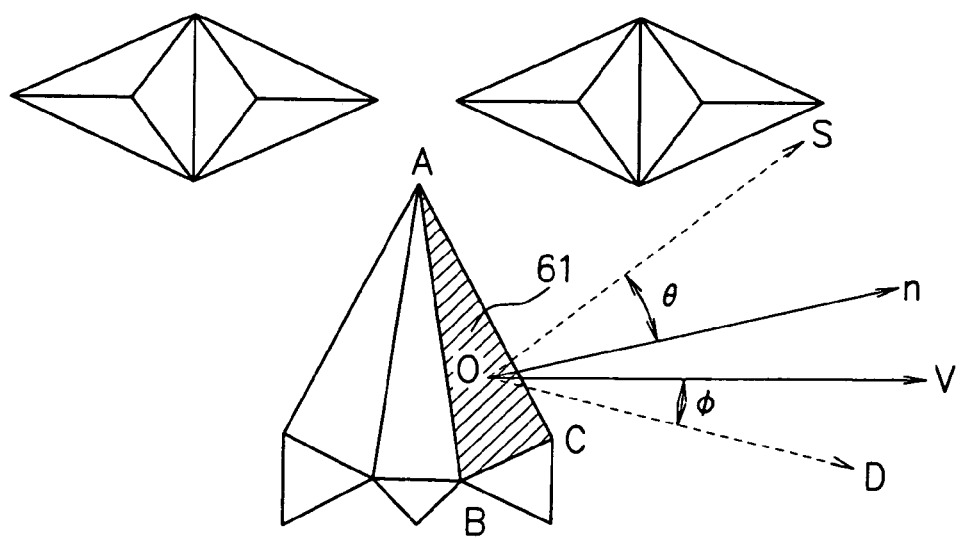
FIG. 6 is a diagram explaining the Phong's model for generating a referential color image by a graphics means of the present invention.

As a result of the foregoing, the angle of the face and the lighting direction are decided. Using the shooting conditions 8, and the shape data 3 and the color image data 4 stored in the database means 5, the referential color image data 11 is generated by the graphics means 10. As for the method to generate the referential color image data 11, a generally known method may be used. For example, the shape data 3 expresses only characteristic parts vicinity of eyes and a nose as a surface shape of a face by a group of fine triangle patches 61 as shown in FIG. 6. An angle of whole surface of the face to a camera is modified according to the angle obtained by the above process. A normal vector n of the surface is obtained from information of the triangle patches 61 whose direction has been modified. Showing one of the triangle patches in FIG. 6 as an example, when a side of the nose is defined as an object area which is an only flat surface surrounded by vertices A, B and C of a triangle, an incident vector s to the triangle patch 61 is obtained from the lighting direction obtained by the above process. When the direction of the camera is given as an viewing vector v, the value (R, G, B)$^t$ incoming to the camera as the color of the triangle patch 61 is expressed as the following equation (7) using a well known reflection model of Phong.

$$\begin{bmatrix} R \\ G \\ B \end{bmatrix} = \begin{bmatrix} R_0 \\ G_0 \\ B_0 \end{bmatrix} \{(1-d)\cos\theta + d\} + \begin{bmatrix} R_W \\ G_W \\ B_W \end{bmatrix} \cos^m \varphi \qquad (7)$$

Here, the (Ro, Go, Bo)$^t$ expresses a longitudinal matrix of a transposed matrix (Ro, Go, Bo), and indicates the color value of diffuse reflection components of an object surface, in which the color image data 4 stored in the database means 5 may be used.

Incidentally, (Rw, Gw, Bw)$^t$ is a value indicating the color of a specular reflection component of the object surface, θ is an angle the normal vector n and the incident vector s form and φ is an angle a specular reflection direction p and the ejection vector v form. Moreover, d is a constant indicating the proportion of a part due to a luminous source and a part due to environmental light in the diffuse reflectance component which is determined by a character of the surface.

Figure 7:
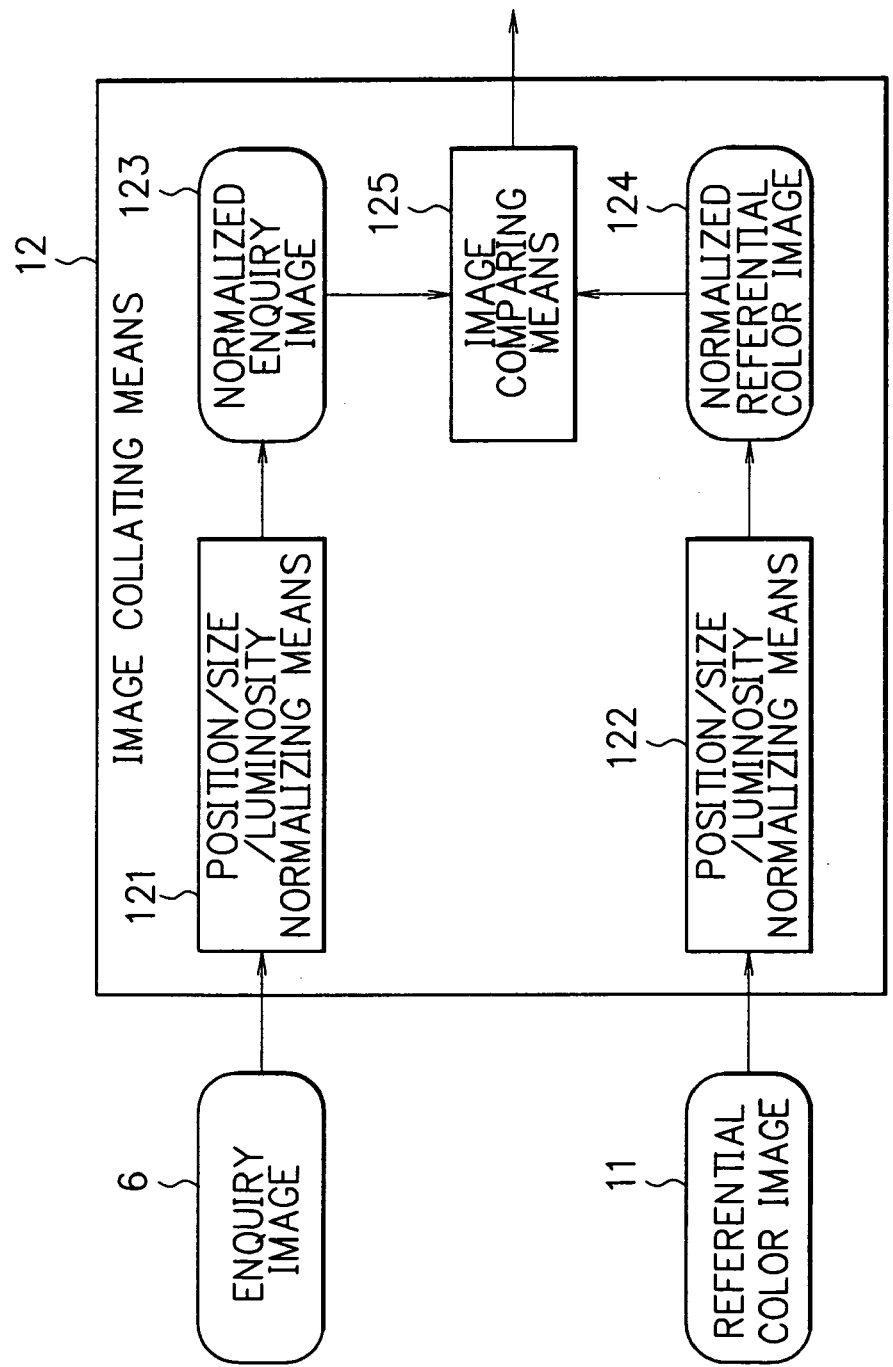
FIG. 7 is a block diagram showing typical constitution of an image collating means according to the present invention.
Figure 8:
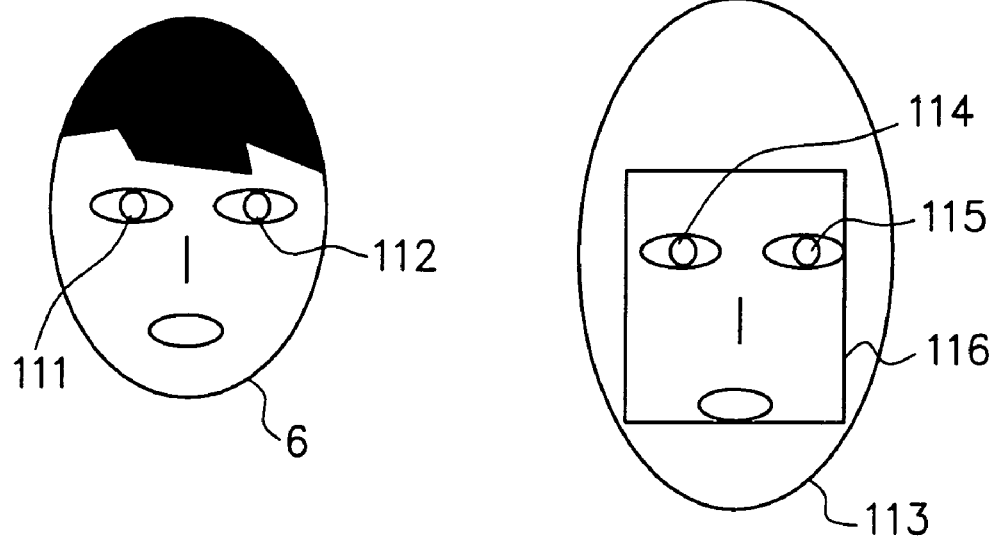
FIG. 8 is a diagram explaining a method of collating images by the image collating means according to the present invention.

The final collation of the enquiry image 6 and the referential color image 11 is executed by the image collating means 12. With a recognition method of two-dimensional images which is generally known so far, a variety of embodiments can be realized. A typical embodiment is shown in FIG. 7. The face images of the enquiry image 6 and the referential color image 11 are normalized respectively by operating position/size/luminosity normalizing means 121 and 122 on them. In the normalization, positions of both pupils 111 and 112, in the enquiry face image 6 for example, are detected, and then parallel displacement, rotation, magnification and minimization of the image are executed so that the detected positions come to standard pupil positions 114 and 115 in a standard face image 113 as shown in FIG. 8. Although it is possible to detect the pupil positions in the image beforehand as the user is observing a display means, an automatic image processing method is also usable. As described above, having the standard face image 113 as a basis, the pupil positions are matched, then differences of width of pupils, width of noses, positions of the noses, width of mouths, positions of the mouths, width of upper lips and lower lips, width of ears, positions of the ears, length of the ears and the like are obtained and thereby normalized. As for the normalizing method, a method described in "Processing Face Image for Newspaper" on pages II -397–403 of "Meeting on Image Recognition and Understanding (MIRU'98)" (Information Processing Society of Japan Symposium Series) written by Sakamoto, Tajima et al. is usable.

Moreover, as the standard face image 113, either the enquiry face image 6 or the referential color image 11 can be used.

Furthermore, as for the luminosity, a comparing area 116 is defined based on the position of the pupils shown in FIG. 8, and distributions of pixel values R, G, B in the comparing area 116 of both the enquiry face image 6 and the referential color image 11 are calculated. For example, an average value $R_a$ and a standard deviation $\sigma_r$ of distribution of the pixel value R in the comparing area 116 of the enquiry image 6 are obtained. Then, each pixel value is converted into R' so as to match with a predetermined average value $R_{a0}$ and standard deviation $\sigma_{r0}$ of a standard pixel value R in the comparing area of a face by the following equation (8). The element values G, and B are processed likewise.

$$R^1 = (R - R_a)\frac{\sigma_{r0}}{\sigma_r} + R_{a0} \quad (8)$$

A normalized enquiry image 123 and a normalized referential color image 124 obtained thus are compared by an image comparing means 125, and the difference between the images is calculated as the following equation (9), thereby the i-th person whose difference $D_i^2$ is minimum is supposed to be identical with the person of the enquiry image 6 and outputted.

$$D_i^2 = \sum_{x,y} \{(R'(x, y) - R'_i(x, y))^2 + (G'(x, y) - G'_i(x, y))^2 + (B'(x, y) - B'_i(x, y))^2\} \quad (9)$$

In the equation (9), R'(x, y), G'(x, y), B'(x, y) are the pixel values of the normalized enquiry image 123 and $R'_i(x, y)$, $G'_i(x, y)$, $B'_i(x, y)$ are the pixel values of the normalized referential color image 124.

The minimum difference $D_i^2$ means, in other words, the highest similarity and the similarity is in proportion to the inverse number of the difference $D_i^2$. Thus, the similarity between the enquiry image and the referential color image which is graphically generated using the three-dimension shape data and the color image data in the database can be obtained.

Incidentally, while the above embodiment has been described using color images, it can be realized likewise using monochrome gray images.

As is explained above, one of the referential color images 11 of a large number of the face shape and image data converted into the database and the enquiry image 6 can be judged to be identical by the image collating means 12 if the images coincide.

While the above embodiment has been described mainly about face images, the present invention is also applicable to things other than human faces: characteristic buildings and historic sites; nature such as mountains, rivers and the sea; animals and plants, in common in point of collating.

Moreover, when a computer reads the face recognition method as a program from a readable recording medium, the computer operates according to the program, therefore it is possible to transmit the program by transmitting media of the Internet or the e-mail style as well as expand the program. Furthermore, the object of the program is not limited to the collating method, the recording medium including database is good as well. An effective face collation can be executed by accumulating a large number of three-dimensional shapes of the face images and surface images thereof.

With the present invention explained above, it is made possible to constitute a system which detects and collates an enquiry face image precisely with face shape and image data converted into database.

Moreover, the above constitution also can be realized as a computer program using a computer system. It is made possible to provide a face recognition system having the same effects as the above embodiment by storing the computer program in a recording medium such as a package software etc., and installing it with database in a personal computer, a super computer and so forth.

While the preferred embodiment of the present invention has been described using specific terms, such description is for illustrative purposes only, and it is to be understood that changes and variations may be made without departing from the spirit or the scope of the following claims.

What is claimed is:

1. A face recognition method for identifying a person by detecting a three-dimensional shape of the person's face and a surface reflectance image thereof and collating the detected three-dimensional shape of the face and the surface reflectance image with enquiry face image data, comprising:

estimating shooting conditions of the enquiry face image data;

generating referential face image data based on the shooting conditions, the detected three-dimensional shape and reflectance image of the surface thereof;

comparing the referential face image data to the enquiry face image data; and identifying the person of the enquiry face image data with the person of the referential face image data based on a difference between the face image data;

wherein the shooting conditions comprise illumination conditions; and wherein said shooting conditions are used to account for shading during the generation of said referential face image data.

2. The face recognition method as claimed in claim 1, wherein the shooting conditions comprise an angle of the face image and a lighting direction, and the detected three-dimensional shape is specified by shape data and color image data.

3. A face recognition method as claimed in claim 2, wherein the referential face image and the enquiry face image are compared after locations of characteristic points, size and brightness of both the face image data have been normalized as parameters.

4. The face recognition method as claimed in claim 2, wherein the shooting conditions comprise a plurality of lighting directions.

5. A face recognition method as claimed in claim 1, wherein the referential face image and the enquiry face image are compared after locations of characteristic points, size and brightness of both the face image data have been normalized.

6. The face recognition method as claimed in claim 1 wherein the referential face image data is generated by using a graphics means.

7. A face recognition method having database which stores detected three-dimensional shapes of human faces and surface reflectance images thereof for identifying a person by collating the detected three-dimensional shape of the specific person's face and the surface reflectance image stored in the database with enquiry face image data, comprising:

estimating shooting conditions of the enquiry face image data;

generating referential face image data based on the shooting conditions, the detected three-dimensional shape and the surface reflectance image stored in the database;

comparing the referential face image data to the enquiry face image data; and identifying the person of the enquiry face image data with the person of the referential face image data based on a difference between the face image data;

wherein the shooting conditions comprise illumination conditions; and wherein said shooting conditions are used to account for shading on said enquiry face during the generation of said referential face image data.

8. The face recognition method as claimed in claim 7, wherein the shooting conditions comprise an angle of the face image and a lighting direction, and the detected three-dimensional shape is specified by shape data and color image data.

9. A face recognition method as claimed in claim 8, wherein the referential face image and the enquiry face image are compared after locations of characteristic points, size and brightness of both the face image data have been normalized as parameters.

10. The face recognition method as claimed in claim 8, wherein the shooting conditions comprise a plurality of lighting directions.

11. A face recognition method as claimed in claim 7, wherein the referential face image and the enquiry face image are compared after locations of characteristic points, size and brightness of both the face image data have been normalized.

12. The face recognition method as claimed in claim 7 wherein the referential face image data is generated by using a graphics means.

13. An object recognition method for identifying an object by detecting a three-dimensional shape of the object and a surface reflectance image thereof and collating the detected three-dimensional shape of the object and the surface reflectance image with enquiry image data, comprising:

estimating shooting conditions of the enquiry image data;

generating referential image data based on the shooting conditions, the detected three-dimensional shape and the surface reflectance image;

comparing the referential image data to the enquiry image data; and identifying the object of the enquiry image data with the object of the referential image data based on a difference between the image data;

wherein the shooting conditions comprise illumination conditions; and wherein said shooting conditions are used to account for shading on said enquiry face during the generation of said referential face image data.

14. The object recognition method as claimed in claim 13 wherein the referential image data is generated by using a graphics means.

15. An object recognition method having database which stores detected three-dimensional shapes of a plurality of objects and surface reflectance images thereof for identifying an object by collating the detected three-dimensional shape of the specific object and the surface reflectance image stored in the database with enquiry image data, comprising:

estimating shooting conditions of the enquiry image data;

generating referential image data based on the shooting conditions, the detected three-dimensional shape and the surface reflectance image stored in the database;

comparing the referential image data to the enquiry image data; and identifying the object of the enquiry image data with the object of the referential image data based on a difference between the image data;

wherein the shooting conditions comprise illumination conditions; and wherein said shooting conditions are used to account for shading during the generation of said referential face image data.

16. The object recognition method as claimed in claim 15 wherein the referential image data is generated by using a graphics means.

17. A face recognition device for identifying a person by detecting a three-dimensional shape of the person's face and a surface reflectance image thereof and collating the detected three-dimensional shape of the face and the surface reflectance image with enquiry face image data, comprising:

an image input means for obtaining the enquiry face image by specifying shooting conditions of the enquiry face image data;

a graphics means for generating referential face image data based on the shooting conditions, the detected three-dimensional shape and the surface reflectance image; and an image collating means for comparing the referential face image data with the enquiry face image data to evaluate the images; and identifying the person of the enquiry face image data with the person of the referential face image data based on a difference between the face image data;

wherein the shooting conditions comprise illumination conditions; and wherein said shooting conditions are used to account for shading during the generation of said referential face image data.

18. A face recognition device as claimed in claim 17, wherein the surface reflectance image is a color image.

19. The face recognition device as claimed in claim 18, wherein
the shooting conditions inputted to the condition input means are an angle of the face image and a lighting direction,
the image collating means includes a normalizing means for normalizing the referential face image data and the enquiry face image data respectively using a standard face image as the basis and
an image comparing means for comparing outputs of the normalizing means that comprise a normalized enquiry image and a normalized referential color image.

20. The face recognition device as claimed in claim 19, wherein the shooting conditions comprise a plurality of lighting directions.

21. The face recognition device as claimed in claim 19, wherein the normalizing means normalizes the location of characteristic points, size and brightness of both the referential face image data and the enquiry face image data.

22. The face recognition device as claimed in claim 17, wherein
the shooting conditions inputted to the condition input means comprise an angle of the face image and a lighting direction;
the image collating means comprises a normalizing means for normalizing the referential face image data and the enquiry face image data, respectively, using a standard face image as the basis; and
an image comparing means for comparing outputs of the normalizing means that comprise a normalized enquiry image and a normalized referential color image.

23. The face recognition device as claimed in claim 22, wherein the shooting conditions comprise a plurality of lighting directions.

24. The face recognition device as claimed in claim 22, wherein the normalizing means normalizes the location of characteristic points, size and brightness of both the referential face image data and the enquiry face image data.

25. A face recognition device having database which stores detected three-dimensional shapes of a plurality of human faces and surface reflectance images thereof for identifying a person by collating the detected three-dimensional shape of the specific person's face and the surface reflectance image stored in the database with enquiry face image data, comprising:
a condition input means for specifying shooting conditions of the enquiry face image data to input, the database for storing the detected three-dimensional shape data of faces and the surface reflectance image data;
a graphics means for generating referential face image data based on the shooting conditions, the detected three-dimensional shape data and its surface reflectance image data stored in the database;
an image input means for obtaining the enquiry face image data; and
a image collating means for comparing and collating the referential face image data with the enquiry face image data, and identifying the person of the enquiry face image data with the person of the referential face image data based on a difference between the face image data;
wherein the shooting conditions comprise illumination conditions; and
wherein said shooting conditions are used to account for shading during the generation of said referential face image data.

26. A face recognition device as claimed in claim 25, wherein the surface reflectance image is a color image.

27. The face recognition device as claimed in claim 26, wherein
the shooting conditions inputted to the condition input means are an angle of the face image and a lighting direction,
the image collating means includes a normalizing means for normalizing the referential face image data and the enquiry face image data respectively using a standard face image as the basis and
an image comparing means for comparing outputs of the normalizing means that comprise a normalized enquiry image and a normalized referential color image.

28. The face recognition device as claimed in claim 27, wherein the shooting conditions comprise a plurality of lighting directions.

29. The face recognition device as claimed in claim 27, wherein the normalizing means normalizes the location of characteristic points, size and brightness of both the referential face image data and the enquiry face image data.

30. The face recognition device as claimed in claim 25, wherein
the shooting conditions inputted to the condition input means are an angle of the face image and a lighting direction,
the image collating means includes a normalizing means for normalizing the referential face image data and the enquiry face image data respectively using a standard face image as the basis; and
an image comparing means for comparing outputs of the normalizing means that comprise a normalized enquiry image and a normalized referential color image.

31. The face recognition device as claimed in claim 30, wherein the shooting conditions comprise a plurality of lighting directions.

32. The face recognition device as claimed in claim 30, wherein the normalizing means normalizes the location of characteristic points, size and brightness of both the referential face image data and the enquiry face image data.

33. An object recognition device having database which stores detected three-dimensional shapes of a plurality of objects and surface reflectance images thereof for identifying an object by collating contents of the database with enquiry image data, comprising:
a condition input means for specifying shooting conditions of the enquiry image data to input, the database for storing the detected three-dimensional shape data of objects and the surface reflectance image data;
a graphics means for generating referential image data based on the shooting conditions, the detected three-dimensional shape data and its surface reflectance image data stored in the database;
an image input means for obtaining the enquiry image data; and
a image collating means for comparing and collating the referential image data with the enquiry image data, and identifying the object of the enquiry image data with the object of the referential image data based on a difference between the image data;

wherein the shooting conditions comprise illumination conditions; and wherein said shooting conditions are used to account for shading during the generation of said referential face image data.

34. The objection recognition device as claimed in claim 33, wherein the shooting conditions inputted to the condition input means are an angle of the object and a lighting direction;

the image collating means includes a normalizing means for normalizing the referential image data and the enquiry image data respectively using a standard object image as the basis; and an image comparing means for comparing outputs of the normalizing means that comprise a normalized enquiry image and a normalized referential image.

35. The object recognition device as claimed in claim 34, wherein the shooting conditions comprise a plurality of lighting directions.

36. A recording medium storing a program being readable by a computer to operate a recognition method having database which stores detected three-dimensional shapes of a plurality of human faces and surface reflectance images thereof for identifying a person by collating contents of the database with enquiry face image data, wherein the program comprises:

estimating shooting conditions of the enquiry face image data;

generating referential face image data based on the shooting conditions, the detected three-dimensional shape and the surface reflectance image stored in the database;

comparing the referential face image data to the enquiry face image data; and identifying the person of the enquiry face image data with the person of the referential face image data based on a difference between the face image data;

wherein the shooting conditions comprise illumination conditions; and wherein said shooting conditions are used to account for shading during the generation of said referential face image data.

37. The recording medium as claimed in claim 36, storing a program being readable by a computer, wherein the shooting conditions comprise an angle of the face image and a lighting direction, and the detected three-dimensional shape is specified by shape data and color image data.

38. The recording medium as claimed in claim 37, storing a program being readable by a computer, wherein the shooting conditions comprise a plurality of lighting directions.

39. The face recognition method as claimed in claim 36 wherein the referential face image data is generated by using a graphics means.

40. A recording medium storing a program being readable by a computer to operate a recognition method having database which stores detected three-dimensional shapes of a plurality of objects and surface reflectance images thereof for identifying an object by collating contents of the database with enquiry image data, wherein the program comprises:

specifying shooting conditions of the enquiry image data to input;

generating referential image data based on the detected three-dimensional shape and the surface reflectance image stored in the database;

obtaining the enquiry image data;

comparing and collating the referential image data with the enquiry image data; and identifying the object of the enquiry image data with the object of the referential image data based on a difference between the image data;

wherein the shooting conditions comprise illumination conditions; and wherein said shooting conditions are used to account for shading during the generation of said referential face image data.

41. The recording medium as claimed in claim 40, storing a program being readable by a computer, wherein the shooting conditions comprise an angle of the object image and a lighting direction, and the detected three-dimensional shape is specified by shape data and color image data.

42. The recording medium as claimed in claim 41, storing a program being readable by a computer, wherein the shooting conditions comprise a plurality of lighting directions.

43. The recording medium as claimed in claim 40 wherein the referential image data is generated by using a graphics means.

44. A recording medium storing a program being readable by a computer to operate a recognition method for identifying an object by detecting a three-dimensional shape of the object and a surface reflectance image thereof and collating the detected three-dimensional shape of the object and the surface reflectance image with enquiry image data, wherein the program comprises:

estimating shooting conditions of the enquiry image data;

generating referential image data based on the shooting conditions, the detected three-dimensional shape and its surface reflectance image;

comparing and collating the referential image data with the enquiry image data; and identifying the object of the enquiry image data with the object of the referential image data based on a difference between the image data;

wherein the shooting conditions comprise illumination conditions; and wherein said shooting conditions are used to account for shading during the generation of said referential face image data.

45. The recording medium as claimed in claim 44 wherein the referential image data is generated by using a graphics means.

* * * * *